United States Patent Office 3,436,359
Patented Apr. 1, 1969

3,436,359
POLYETHER POLYPRIMARY POLYAMINES AND ELASTOMERIC PRODUCTS THEREOF
Allen J. Hubin, White Bear Lake, and Samuel Smith, Roseville, Minn., assignors to Minnesota Mining and Manufacturing Company, St. Paul, Minn., a corporation of Delaware
No Drawing. Filed Oct. 14, 1965, Ser. No. 496,139
Int. Cl. C08g 23/12, 30/00, 25/00
U.S. Cl. 260—2                                12 Claims

ABSTRACT OF THE DISCLOSURE

A water insoluble polyether polyamine having a molecular weight of at least 3500 and having a primary amino terminal group attached directly to each end of a polyether moiety containing recurring groups of which at least a major portion consists of oxytetramethylene recurring units and at most a minor portion consists of oxyalkylene or thioalkylene recurring units having from 2 to 6 straight chain carbon atoms, at least half of said primary amino terminal group having the structure —$OC_4H_8NH_2$, said polyether moiety having less than about three percent by weight of secondary amino nitrogen atoms and less than about 0.3 percent by weight of tertiary amino nitrogen atoms in its essentially linear chain. Also includes the reaction products of such polyether polyamines with epoxy resins, isocyanates, dicarboxylic acids or diacyl halides.

---

This invention relates to polyether polyprimary polyamines and derivatives thereof. In one aspect this invention relates to essentially linear tetrahydrofuran polymers having a high degree of terminal primary amino functionality. In still another aspect this invention relates to reaction products of various resins and polyether polyamines having a high degree of terminal primary amino functionality.

Various polyether polyamines have been described in the literature, some of which have been suggested for use in reactions with epoxy resins. Essentially linear polyether diprimary diamines prepared by the cyanoalkylation of polyether glycols and subsequent hydrogenation have been described in British Patent No. 988,632 and United States Patent No. 3,044,989. The resulting polyether diprimary amine is characterized by oxytrimethylene groups adjacent to the terminal primary amine radicals. In U.S. Patent No. 2,888,439 polyurethane diamines including oxyalkylene recurring units in the molecular structure are described. However, the process for making such polyurethane diamines suffers the following inherent disadvantages: (a) two steps are involved and these are not susceptible to close control with respect to final molecular weight distribution of the resin; and (b) the urethane linkages introduced are inherently unstable with respect to both elevated temperature and hydrolytic environments. Another method for the preparation of polyether diprimary diamines involves the addition of ammonia to a polyglycol with the conversion of the terminal hydroxy groups to primary amino radicals, as shown in U.S. Patent No. 3,179,606. Polyamines prepared by the latter procedure tend to contain some residual unreacted hydroxyl groupings, which can seriously interfere with subsequent curing and/or other reactions, particularly if higher molecular weight cured products are desired. This type of amination process requires extreme conditions of temperature and pressure and is known to result in a conglomerate mixture of products wherein the primary amine is often only a minor component. Previous processes for preparing polyether polyamines have described the use of a ω,ω'-polyether glycol as the starting material. There has been a continuing problem in providing water insoluble polyether glycols in the molecular weight range above about 3500 which have the requisite high degree of active end group functionality, i.e., a hydroxyl at essentially each terminal position of the resin molecule. Thus, it has not heretofore been suggested that one start with a polyether glycol resin in this molecular weight range and convert it to a polyether diprimary diamine, since the initial terminal inactive groups, which are almost invariably present in high concentration in this molecular weight range, would persist in the final product, irrespective of the nature of the amination process used. In addition, the side reactions and incomplete conversions which are common under the conditions of previously known amination processes serve to detract further from the end group functionality of the polyether polyamine prepared. The process of the present invention, which avoids the necessity for using polyether glycol as a starting material, permits the realization of a water insoluble polyether polyamine with a high degree of end group functionality, even in the higher molecular weight ranges.

It is an object of this invention to provide a new class of polyether polyprimary polyamines having a high degree of terminal primary amino functionality and having relatively high molecular weights. Still another object of this invention is to provide vulcanizates having outstanding physical properties. A further object of this invention is to provide a new and useful class of segmented polymers. A still further object of the invention is to provide a simplified and less expensive process for the preparation of outstanding rubbers and elastic fibers. Other objects and advantages will be apparent from the following disclosure.

In accordance with this invention applicants have provided a water insoluble, polyether polyamine having a molecular weight of at least 3500 and having a primary amino group attached directly to each end of an essentially linear polyether moiety containing recurring groups of which at least a major portion consists of oxytetramethylene recurring units and at most a minor portion consists of recurring units of another oxyalkylene or thioalkylene having from 2 to 6 straight chain carbon atoms, at least half of the primary amino terminal groups having the structure—$OC_4H_8NH_2$, said polyether moiety having less than about 3 weight percent of secondary amino nitrogen atoms and less than about 0.3 weight percent of tertiary amino nitrogen atoms in its essentially linear chain. It should be appreciated that the occasional presence of tertiary amino nitrogen atom in the chain will introduce a branch or side chain, the branch having recurring groups and termination similar to the polyether moiety in the main chain. However, because of the relative low frequency of occurrence of these tertiary nitrogen atoms and branching sites, the polyether moiety of these polyether polyamines is appropriately referred to herein as "essentially linear." These polyether polyamines are characterized by an exceptionally high degree of primary amino terminal functionality and are essentially free of terminal hydroxyl groups. Their high degree of primary amino functionality may be characterized by their ability to react with a standard epoxy resin to produce an elastomeric cured product having minimum ultimate tensile and minimum ultimate elongation values. Specifically, polyether polyprimary polyamines of this invention provide elastomeric products having ultimate elongations of at least 400% and minimum ultimate tensile strengths of 500 pounds per square inch when mixed with a stoichiometric amount of the diglycidyl ether of 2,2 - bis(para-hydroxyphenyl)propane, sometimes called "bisphenol A", having an oxirane equivalent weight of 190–200, in the presence of two percent (based on total solids weight) of thiobis(di-secondary amyl phenol) and heated for four hours at a temperature of 120° C. A sheet formed from this material is then tested for ultimate elongation and ultimate tensile by the procedures set forth in ASTM D412–62T using die C for specimen preparation and a rate of extension of 10 inches per minute at a test temperature of 23° C. The particularly preferred polyether polyprimary polyamines have molecular weights above 4500.

These polyether polyprimary polyamines may be prepared by reacting tetrahydrofuran and up to about 40 mole percent of another cationically polymerizable cyclic ether or thioether in the presence of trifluoromethanesulfonic anhydride at temperatures from about −40° C. to +80° C. in a polymerization system which is relatively free of, i.e. which contains at most only minor amounts of, monoalkylatable chain terminating agents to produce a polymer having a high degree of cationic activity at both ends of the polymer chain. Suitable cationically polymerizable cyclic ether comonomers having from 2 to 6 ring carbon atoms include oxacycloheptane; 3,3-bis - (chloromethyl)oxacyclobutane; phenyl glycidyl ether; propylene oxide; ethylene sulfide, epichlorohydrin; 2-methyl tetrahydrofuran; etc., all of which introduce from 2 to 6 carbon atoms into the polyether chain.

The molecular weight of the dicationically active polyether varies in an inverse manner with the concentration of trifluoromethanesulfonic anhydride, and a 1/100 to 1/7000 molar ratio of trifluoromethanesulfonic anhydride, to cyclic ether monomer is desired for the production of dicationically active polyethers having molecular weights from about 3500 to about 250,000 in a conversion of about 50%.

The dicationically active polyethers are strong alkylating agents and react with ammonia to add primary amino radicals to the cationically active terminal sites. From stoichiometric to excess amounts of ammonia are preferred in this reaction, and a temperature from about −100° C. to about +60° C. is generally suitable, although the lower temperatures are generally preferred to moderate the rate of reaction. Solvents which are inert to alkylation reactions, such as methylene chloride, trichlorofluoromethane and cyclohexane, may be employed. Depending on the concentration ratio of ammonia to the dicationically active polyether, the polyamine product can contain secondary or tertiary amine groups, internally situated in the essentially linear polyether moiety, since the terminal primary amino radical can be further alkylated by another cationically active polymer molecule. As mentioned earlier, the presence of tertiary amino nitrogen atoms in the polymer chain can provide some branched chains with recurring units similar to those in the main polymer chain, but the molecule may still be considered to be essentially linear. For the preparation of a polyether diprimary diamine a large excess of ammonia, generally at least a five-fold excess, is preferably used.

The utility of these polyether polyprimary polyamines is not limited by their unique character, and they may be generally used as substitutes for known polyether polyprimary polyamines in various compositions and in reactions common to such materials. However, a particularly preferred and unique class of products having outstanding elastomeric properties may be prepared by reaction of these polyether polyprimary polyamines with epoxy resins having an oxirane equivalence greater than 1 to produce elastomeric vulcanizates, or with polyisocyanates to produce elastomeric polyether-ureas. Those polyether polyprimary polyamines having a molecular weight above about 30,000 find their primary utility in the preparation of hot melt adhesives and as intermediates in the preparation of block copolymers. Polyether polyprimary polyamines with molecular weights between about 3500 and 30,000 are preferred for the preparation of elastomeric materials.

Exceptionally wide latitude is afforded in the selection of the conditions which are used in carrying out the reaction of polyether polyprimary polyamines with epoxy resins. Principal variables to be considered in such vulcanization reactions are:

(1) The specific epoxy resin chosen,
(2) The manner of addition of the polyether polyprimary polyamine to the epoxy resin,
(3) The use of catalysts or co-curatives with these reactants, and
(4) The ratios of these reactants.

Any of a large number of epoxy resins can be used in such vulcanization reactions. These may include monoepoxides in addition to polyepoxides. If a mixture of epoxy resins is employed, it is important that the oxirane equivalence be greater than 1, preferably at least 1.5. The choice of an aliphatic epoxy resin generally serves to give a somewhat more fluid mix with the resins of this invention and produce a final vulcanizate which is superior in ultimate elongation properties. The use of epoxy resins having a high content of aromatic or condensed ring structures generally gives a final vulcanizate which is superior in load bearing properties but somewhat lower in ultimate elongation. The polyepoxide resins which are particularly useful in preparing the vulcanizates of this invention are well known and need not be set forth in detail. Monoepoxide resins which may be employed to advantage, particularly when mixes of lower viscosity are desired, include butyl glycidyl ether, phenyl glycidyl ether and allyl glycidyl ether. A particularly preferred class of polyepoxide resins is derived from the reaction of epichlorohydrin with bis-phenol A. This class may be represented by the formula:

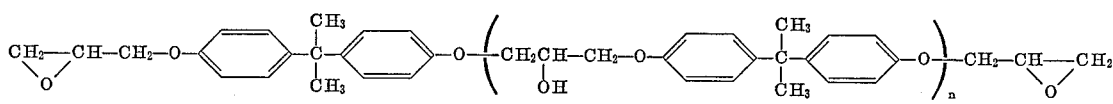

In this formula $n$ may have a value of between 0 and about 10. The structure of this diepoxide resin class may be described by reference to either its melting point or, more usually, to its oxirane equivalent weight. Thus, when $n$ has a value of 0 the resin has an oxirane equivalent weight of 170 and when $n$ has a value of 10 the resin has an oxirane equivalent weight of 1590. The polyepoxide resin employed for the purposes of this invention is usually a mixture of compounds and will generally have an oxirane equivalent weight ranging from 170 to 1590, but lower and higher equivalent weight epoxy resins may be employed to advantage on occasions.

There are two methods of reacting the resins of this invention with epoxy resins which generally are employed. The first involves simply the mixing of the polyether polyprimary polyamine with the epoxy resin, either with or without solvents, and the direct conversion to a vulcanized elastomeric state. This process is commonly referred to as an "A-stage" procedure. An alternative method of producing these vulcanizates involves a prereaction of the polyether polyprimary polyamine with the epoxy resin to form an adduct which is still soluble and processable. This process is normally referred to as a "B-stage" procedure. Adducts of this type may conveniently be prepared by the reaction of these polyether polyprimary polyamines and an epoxy resin in a 50% solution of the mixed resins in toluene or other suitable solvent at a reflux temperature for a period of about 2 to 8 hours. In the B-stage reaction it is normally desirable to employ an oxirane/amine equivalence ratio of at least 1.5 to 1, preferably at least 2.5 to 1. The oxirane/amine equivalence ratio is defined as the number of oxirane equivalents present in the total weight of epoxy resin divided by the number of amine-attached, active hydrogen equivalents present in the total weight of the amine.

The viscosity and the shelf-life of the adduct solution are largely dependent upon the molecular weight of the starting polyether polyprimary polyamine and the equivalence ratio of oxirane to amine. At the lower oxirane/amine equivalence ratio, e.g. 1.5:1 to 4:1, considerable viscosity increase occurs during the reaction. An initial viscosity of 1500 centipoises at room temperature is typical of a 50% toluene solution in which a 10,000 molecular weight polyether diprimary diamine is used at the beginning of the reaction. After 4 hours of reflux the viscosity increases to about 5000 centipoises if the oxirane/amine equivalence ratio is 3:1 and the epoxy resin used is the diglycidyl ether of 2,2-bis(para-hydroxyphenyl)propane. If a 7:1 equivalence ratio for the same resin mix is used, the viscosity increases only to about 2200 centipoises. Normally the adduct resins have a long and useful shelf-life, particularly when stored as a 50% solution in an inert solvent, such as toluene. Such adduct resins undergo less than about a 50% increase in viscosity at room temperature over a period of about 6 months. The viscosity of the adduct resin is preferably less than about 20,000 centipoises at the time it is utilized.

These adduct resins find use in various coating or casting operations which involve their ultimate conversion to a cured, or "C-stage," state. The B-stage procedure is often a preferred method for obtaining elastomeric vulcanizates, since the adduct is normally still soluble in conventional inert solvents and can be subsequently cured by the addition of catalyst alone, with or without the application of heat. It has generally been found that superior adhesion to various substrates is obtained by using B-stage rather than A-stage resins, and frequently the adhesion is sufficient to eliminate the necessity for substrate priming. Thus, even at room temperature the B-stage adducts of epoxy resins and the polyether polyprimary polyamines of this invention can be cured to bond various vulcanized rubbers (such as neoprene) to glass, fabric or other rubbers, the resulting bonds frequently being stronger than the internal strength of the materials being adhered. The use of A-stage resins rather than the B-stage adducts for producing elastomeric vulcanizates is indicated in applications where solvents cannot be tolerated.

Irrespective of whether "A" or "B" stage resins are employed, wide latitude exists in the choice of the vulcanization reaction conditions chosen. With respect to catalysts, it is possible to employ a tertiary amine, a Lewis acid (e.g. boron trifluoride diethyl etherate), or a wide variety of organo-metallic compounds to accelerate the cure. A particularly useful vulcanization method involves the use of between about 0.5 and 10 parts by weight of 2,4,6-tris(N,N-dimethyl aminomethyl)phenol as the curing catalyst based on 100 parts of resin. When this catalyst is used, cure conditions normally vary from approximately one day at 25° C. to 2 minutes at 150° C. using about 3 parts by weight of catalyst per 100 parts of adduct. The catalyst is mixed into the resin formulation immediately prior to its application in the final end use. The physical properties of the cured product will vary with the molecular weight of the starting polyether polyamine and also with the oxirane/amine equivalence ratio used. In some instances it may be advantageous to include a co-curative, e.g. an additional polyprimary polyamine or an organic polyanhydride, in the reaction mixture. Thus, metaphenylene diamine or diethylene triamine may be employed along with the polyether diprimary diamines of this invention, the amount of epoxy resin used being increased sufficiently to insure an oxirane/total amine equivalence of about 1:1 in an A-stage formulation and at least 1.5:1, preferably at least 2.5:1 in B-stage formulations. The addition of such additional diamines is desirable when the ultimate objective is to produce a more rigid vulcanizate having a higher heat distortion value. Various other fillers and additives usefully employed in the curing of epoxy resins may also be included.

When the initial polyether polyprimary polyamine has a molecular weight of about 3500, an oxirane/amine equivalence ratio of between 1.0 and 5 normally produces, upon curing, an elastomeric product (Shore $A_2$ hardness below 95). When the polyether polyprimary polyamine has a molecular weight of about 5000, an oxirane/amine equivalence ratio of between 1.0 and 8 normally will produce an elastomeric cured product. When the polyether polyprimary polyamine has a molecular weight of about 10,000, an oxirane/amine equivalence ratio of between 1.0 and 12 generally produces an elastomeric cured product. At oxirane/amine ratios significantly higher than 12 the final cured products are generally hard enough to be classified as rigid plastics (Shore $A_2$ hardness value of at least 95).

Another important aspect of this invention is the provision of a novel class of resins which can serve as intermediates in the preparation of chain extended polyether-ureas or polyether-amides displaying remarkable utility as elastomers, particularly with respect to elastomeric fibers. The manufacture of chain extended polymers having high values of ultimate tensile strength and high ultimate elongations are known and require no further elaboration. Essentially the literature sets forth the requirements that the final elastomer must contain a relatively high molecular weight recurring component which is water insoluble and low melting, and that these segments must be linked together by relatively small highly polar bridging radicals which serve to confer higher elastic moduli and higher tack temperatures to the products. It has previously been found that particularly useful classes of such bridging radicals include urea or polyurea or amide or polyamide radicals. It has been recognized that a particularly desirable structure for the low melting, relatively high molecular weight segment is a polyether moiety. Indeed several classes of chain extended polymers with these outstanding physical properties in which polyether moieties have been linked together within the final molecule with urethane, urea or amide linking radicals have been made. However, it is significant that no one has reported successful use of this class of polyethers in the molecular weight range of 3500 or higher to achieve a chain extended composition having final properties which meet the requisite properties of a useful elastic fiber of the spandex type. The minimal physical properties which are normally considered to define a material useful as a spandex fiber are an ultimate tensile strength in excess of 5000 p.s.i., an ultimate elongation in excess of 400% and a high degree of recovery after nominal extension.

Applicants have found that one may employ the polyether polyprimary polyamines, more specifically the polyether diprimary diamines, of this invention to prepare chain extended products with the outstanding characteristics required for use as an elastic fiber. This class of chain extended polyether-urea or polyether-amide materials is readily prepared by the reaction of an approximately stoichiometric concentration of an organic diisocyanate, organic dicarboxylic acid (e.g., adipic acid) or organic diacyl halide (e.g., terephthalyl chloride) with an admixture of a polyether diprimary diamine of this invention and one to twenty moles, per mole of polyether diprimary diamine, of a simple organic diprimary or disecondary diamine. Exemplary of suitable simple diamines which may be advantageously used for preparing such chain extended compositions are hydrazine, hexamethylene diamine, p-xylylene diamine, 1,4-bis (aminomethyl)cyclohexane, piperazine and trans-2,5-dimethyl piperazine. Although it is convenient to carry out this reaction in a solvent such as dimethylsulfoxide or dimethylformamide, it is most noteworthy that the reaction may also be carried out in the presence of solvents which are normally considered to be reactive with diisocyanates or diacyl halides, such as water-acetone or water-isopropanol mixtures. This process is a simple, one step reaction in which the chain extension is usually performed at ambient temperatures. When an organic dicarboxylic acid is used as the chain extending reactant it is necessary to employ elevated temperatures, and it has been found convenient to perform the latter reaction in the melt rather than in solution. When diacyl halides are employed in the chain extending reaction it is desirable to include an acid acceptor, such as sodium carbonate, in the reaction system. The polyether diprimary diamines of this invention may also be reacted with polyanhydrides, such as pyromellitic dianhydride, to prepare polyether amic acids which may subsequently be converted to chain extended and/or cured elastomeric polyether-imides.

The polyether polyprimary polyamine resins of this invention find utility in the preparation of a wide variety of products. The isocyanate capped resins, prepared by reacting the polyether polyprimary polyamine with an excess of a polyisocyanate, may be submitted to moisture curing conditions to give a strong, elastic vulcanizate in approximately one-fifth of the time required to convert an isocyanate capped polyether glycol or polyester glycol to the fully cured state under comparable conditions. Such capped resins find wide utility as protective coatings, sealants and adhesives. When these capped resins are cured by reaction with a polyol or polyamine, they are useful for the preparation of cast or molded parts, e.g., very resilient balls.

The chain extended products derived from the polyether diprimary diamines of this invention in the manner set forth above are extremely useful in applications which demand a still processable elastomer having a high degree of elasticity, strength (particularly strength at temperatures up to about 150° C.) and elongation. The properties of these chain extended products may be varied over a wide range by a judicious choice of the relative concentration of the simple diprimary or disecondary diamine employed in admixture with a particular polyether diprimary diamine resin during the chain extension reaction with essentially stoichiometric concentrations of organic diisocyanates, diacyl halides or dicarboxylic acids. When the resin has an initial molecular weight of 3500, a molar ratio of between about 1:1 to about 1:3 of polyether diprimary diamine to simple diamine produces upon chain extension a strong elastomer with an elongation of at least 400% which is suitable for the production of elastic fibers of the spandex type. As reported in Belgian Patent No. 637,266 a spandex fiber should have a minimum ultimate elongation of 400%. Such materials are also very useful in the preparation of coatings, films and fibrids.

When the resin has an initial molecular weight of 10,000, a molar ratio of between about 1/3 to about 1/12 of polyether diprimary diamine to simple diamine is preferred to give a chain extended product having the properties required of a good elastic fiber.

Strong chain extended products with ultimate elongations which decrease progressively with decreasing ratios of polyether diprimary diamines to simple diamines find many uses. For example, such materials have great value as adhesives, particularly when some hydrolytic stability and strong adhesive bonds are required at temperatures up to about 150° C.

The cured products derived from the polyether polyprimary polyamines of this invention also find utility as casting resins, as adhesives, as coatings and as sealants. These resins are susceptible to curing on reaction with either carbon disulfide, formaldehyde, aminoplast resins (i.e., urea or melamine/aldehyde reaction products), phenolic resins (i.e., phenol/aldehyde reaction products), polyisocyanates or epoxy resins having at least one (preferably at least 1.5) oxirane ring per molecule. The vulcanizates produced by the reaction of the polyether polyprimary polyamines with epoxy resins (see Britsh Patent No. 988,632 for further illustrative useful epoxy resins) are of special interest, since such vulcanizates are characterized by extremely low brittle points and also by a high degree of sunlight resistance, hydrolytic stability and good electrical insulation properties. When the reactant ratios are chosen to give elastomeric vulcanizates, the products are characterized by high tensile strength, good elongation, high coefficient of friction, outstanding abrasion resistance, low compression set, high resilience, good chemical resistance and outstanding adhesive characteristics. These elastomers find utility in the manufacture of such rubber goods as tires, golf balls, skid resistant pads, textile and paper processing rollers, shoe soles, etc. The properties of the resulting vulcanizates make the uncured mixtures extremely valuable in the preparation of coatings, polishes, paints and finishes for textiles, leather, metals, plastics, rubbers, concrete, wood, etc. The cured resins adhere very tenaciously to leather and accordingly are useful as finishes for shoe uppers, as coatings for leather pulley belts to impart skid resistance and as adhesives for the repair of holes or cracks in shoe uppers or soles. These vulcanizates adhere extremely well to most substrates. Thus, they are useful for bonding materials to glass, metals, concrete, textiles, rubbers, plastics, wood, etc. The polyether polyprimary polyamine/epoxy resin formulations are also useful for the preparation of attractive, seamless extremely durable flooring and roofing surfaces. In all their uses the resins may be applied with or without a wide variety of filler materials, e.g., silica, carbon, talc, titanium dioxide, etc.

When an epoxy resin concentration is used which is higher than that recommended above for the preparation of elastomeric vulcanizates from a polyether polyprimary polyamine having a particular molecular weight, a relatively rigid vulcanizate (i.e., one which has a Shore $A_2$ hardnes greater than about 95) is produced. Such materials possess a superior combination of tensile strength, ultimate elongation, abrasion resistance, and impact strength and are useful in coating applications, as well as in the casting of parts having good durability characteristics under conditions of severe impact or severe mechanical stress.

EXAMPLES 1–4

These examples describe the preparation of a series of poly(tetramethylene oxide)diprimary diamines. Their subsequent utilization in capping, curing and chain extension reactions is disclosed in later examples. The tetrahydrofuran used in these reactions was a commercial reagent grade, peroxide-free monomer. The polymerization was carried out in a 25-gallon glass-lined reactor equipped with a stirrer. The polymerization was initiated in each case by the addition of freshly distilled trifluoromethanesulfonic anhydride to the stirred tetrahydrofuran which had been previously cooled to 15° C.

The amination reaction was carried out in a 50-gallon stirred stainless steel reactor containing anhydrous ammonia dissolved in a solvent indicated in the table below. The polymerization was carried out in each instance under 10 pounds per square inch gauge of nitrogen pressure. The amination was accomplished by draining under pressure the polymerized product containing the dicationically active polyether very rapidly through a one-inch poly-ethylene tube into the closed amination kettle which was always under about 35 p.s.i. pressure. The amination kettle was cooled continuously to about 12° C. to moderate the reaction. In each case the transfer into the amination kettle took from two to four minutes. After transfer was completed the resulting polyether diamine solution was stirred for ½ hour and then the excess ammonia was vented to the atmosphere. The excess tetrahydrofuran and residual ammonia were then vacuum-stripped off, the temperature being gradually increased to about 40° C. The polyether diprimary diamine was then diluted to about 30% solids by the addition of toluene. The catalyst residues were removed by the addition of a strongly basic ion exchange resin, to the kettle wherein it was slurried. Removal of catalyst fragments was always checked by examination of the infrared spectra. Absence of absorption bands at 9.7 and 15.7 microns showed that purification was complete. Where absorption bands were detected in the regions mentioned following the ion exchange step, additional ion exchange resin was added and the slurry procedure was repeated until the filtrate showed no detectable absorption in the infrared spectra. The mixture was then filtered and the solutions were vacuum-stripped at temperatures up to 95° C. to bring the products to 100% resin.

The table below indicates the various ratios of reactants that were utilized in these preparations.

TABLE I

| Example No. | 1 | 2 | 3[1] | 4 |
|---|---|---|---|---|
| Polymerization condns: | | | | |
| Tetrahydrofuran, lb | 60 | 94 | 98 | 176.4 |
| $(CF_3SO_2)_2O$, lb | 6 | 6 | 2 | 3.6 |
| Reaction time, min | 12 | 13 | 30 | 28.5 |
| Max. reaction temp., °C | 58 | 51 | 40 | 38 |
| Amination condns: | | | | |
| Ammonia, lb | 10 | 7.2 | 2.5 | 4.3 |
| Toluene, lb | 128 | 92.8 | 97 | |
| Tetrahydrofuran, lb | | | | 95.7 |
| Product characterization: | | | | |
| Percent conversion | 42 | 39.5 | 42.6 | 49 |
| Number avg. molecular weight | 2,700 | 3,600 | >10,000 | 10,000 |
| Amine equiv. wt. (by titration) | 1,200 | 1,680 | 5,270 | 4,610 |
| Inherent viscosity, in benzene at 25° C | | | 0.36 | 0.42 |
| Viscosity at 65° C., centipoise | | | 100,000 | 49,500 |

[1] 0.5 lb. of 4,4'-thiobis(6-tertiary butyl-m-cresol) was added to product after purification.

EXAMPLE 5

This example describes a preparation of a branched polyether polyamine in which each of the end groups is a primary amine, while secondary and tertiary amine groups appear in the form of recurring nitrogen atoms situated sporadically within the polyether chain. The general process for preparing these functionally terminated polyethers permits the preparation of products containing these recurring groups by maintaining the concentration of the polymerization terminating agent, i.e., ammonia, at a relatively low molar level with respect to the concentration of the polymerization catalyst.

275 ml. of anhydrous tetrahydrofuran was placed in a 500 ml. round-bottomed flask equipped with a stirrer. The flask was cooled to −40° C. and 3 ml. of trifluoromethanesulfonic anhydride was added. On warming to room temperature an increase in viscosity was noted, indicating that polymerization was occurring. Ammonia gas was introduced by bubbling it slowly through the solution to maintain a relatively low concentration of ammonia. When the addition began there was an immediate reaction, as evidenced by a very rapid and abrupt viscosity increase in the solution. Ammonia addition was stopped when the reactants could no longer be satisfactorily stirred. The product was poured into dilute aqueous sodium hydroxide and heated with agitation on the steam bath. It was then washed with water and dried in a vacuum oven at 50° C.

The product was obtained in 150 g. yield. It was not completely soluble in benzene but was soluble in methyl ethyl ketone, in which solvent it had an inherent viscosity of 0.402 at 25° C., corresponding to an approximate average molecular weight of 28,000. Elemental analysis gave 2.2% nitrogen, which corresponds to about 44 nitrogen atoms per viscosity average molecule present in the form of primary, secondary and tertiary amine groups, the tertiary amine groups being present as branching sites along the polyether polyamine chain. This polyether polyamine product was curable to a very tough rubber having good adhesion to aluminum when heated with 1% by weight of the diglycidyl ether of bisphenol A, oxirane equivalent weight=190.

EXAMPLE 6

This example illustrates the use of the polyether diamines of this invention to produce hard, flexible vulcanizates which possess outstanding physical properties.

Two different sheets were cast using the following mixes. Mix No. 1 contained 100 parts of the digylcidyl ether of bisphenol A (oxirane equivalent weight=190), 25 parts of the poly(tetramethylene oxide) diprimary diamine of 3600 molecular weight described in Example 2 above and 14 parts of meta-phenylene diamine. The second mix was made in the ratio of 100 parts of the same epoxy material, 50 parts of the same polyether diamine, and 14 parts of meta-phenylene diamine. The castings were made by pouring these liquid mixes between glass sheets spaced ¼ inch apart and treated with mold release agent. Each mix was cured for three days at 65° C. These glass-like sheets had the following properties: Sheet No. 1 had a Shore D hardness of 83, an ultimate tensile strength of 9210 p.s.i., and an ultimate elongation of 7.5%. It showed volume increases of 1% and no hardness change on immersion at room temperature for one week in distilled water and also in 15% acetic acid. Sheet No. 2 had a Shore D hardness of 77, an ultimate tensile strength of 5430 p.s.i., and an ultimate elongation of 22.0%. It showed a 1.5% volume increase on immersion in water for one week and a 4% volume increase on immersion in 15% acetic acid for one week with insignificant hardness changes. The outstanding impact resistance of both vulcanizates could be demonstrated by hammering a screwdriver through each of these sheets. In both cases the screwdriver went through the sheet cleanly without cracking the plastics.

EXAMPLE 7

A mixture of 6 g. of the poly(tetramethylene oxide) diprimary diamine of Example 3 (molecular weight > 10,000) and 1.3 g. of a reaction product of bisphenol A and epichlorohydrin (molecular weight=1120, oxirane equivalent weight=560) was dissolved in about 20 ml. of methylene chloride. This solution was centrifugally spun cast overnight at 80° C. The resulting film was then cured for two hours at 120° C. to give a very tough, snappy elastomer having an ultimate tensile strength of 7600 p.s.i. and an ultimate elongation of 660%.

EXAMPLE 8

This example illustrates the use of "A-stage" and "B-stage" resin mixes in the preparation of vulcanizates.

40 g. of the poly(tetramethylene oxide) diprimary diamine of Example 4 was mixed with 10.65 g. of the diglycidyl ether of bisphenol A (equivalent weight=192) and 0.530 g. of DMP-30, which is 2,4,6-tris(dimethylaminomethyl)phenol. This mix represents the use of an oxirane to amine equivalence ratio of 3.2 to 1. The cure was allowed to progress for 72 hours at room temperature, and the physical properties were then measured. The Shore $A_2$ hardness was 57, tensile strength was 2270 p.s.i., and ultimate elongation was 358%. The ASTM compression set of a standard plug made from this mix was 24% following 72 hours under 25% compression at 100° C.

A second mix was made using 40 g. of the same polyether diamine, 12.8 g. of the same epoxy resin (a 4 to 1 oxirane to amine equivalence ratio), and 0.64 g. of DMP-30. This mix was vulcanized for three hours at 90° C. to give a rubber having a Shore $A_2$ hardness of 62, a tensile strength of 2690 p.s.i., and an ultimate elongation of 260%.

A third mix was made using 80 g. of the same polyether diamine, 39.6 g. of the same epoxy resin (this involves a 6 to 1 oxirane to amine equivalence ratio), and 1.98 g. of DMP-30. This was cured for three hours at 90° C. to produce an elastomer having a Shore $A_2$ hardness of 82, tensile strength of 3160 p.s.i., and an ultimate elongation of 300%.

A "B-stage" adduct was made by refluxing a mixture of 800 g. of the polyether diamine resin described above, 400 g. of the same epoxy resin described above, and 1200 g. of toluene for six hours. At that time the mixture was allowed to cool and 12 g. of phenol was dissolved therein. 40 g. of this adduct was mixed with 0.34 g. of DMP-30 and allowed to cure for 16 hours at room temperature and then 1 hour at 105° C. It had a tensile strength of 2800 p.s.i., and an ultimate elongation of 160%. A second mix was made using 40 g. of this same adduct, 2 g. of DMP-30, and 0.6 g. of 4,4′-thiobis(6-tertiary butyl-m-cresol). The material was cured for one hour at 90° C. The properties of this vulcanizate were: tensile strength= 4920 p.s.i., ultimate elongation=275%. The tensile strength of this material was 1750 p.s.i. when tested at 80° C.

EXAMPLE 9

This example illustrates the use of a "B-stage" resin to prepare a vulcanizate having outstanding adhesive and abrasion-resistant characteristics.

A mix of 114 g. of the diglycidyl ether of bisphenol A (oxirane equivalent weight=192) and 300 g. of the polyether diprimary diamine resin of Example 4 was dissolved in 415 g. of toluene and the solution was refluxed for six hours, at which time the viscosity of the solution, when measured at room temperature, was 4500 cps. 6.2 g. of phenol was added to the solution. 0.3 g. of DMP-30 was added to a 20 g. aliquot of this adduct solution. A small portion of this solution was coated onto the tapered ends of each of two neoprene laboratory-type stoppers, the tapered end measuring ¼ inch in diameter. Solvent was allowed to flash off and then the ends were joined and pressed between the jaws of a C clamp for 24 hours at room temperature. At that time the samples were pulled in tension. The bond proved to be stronger than the internal strength of the neoprene, since failure occurred at a point significantly removed from the glue line.

A sheet was centrifugally cast from the remainder of this mix and then cured for three hours at 105° C. The sheet was submitted to the Taber abrasion test using 1 kilogram load and an H-22 wheel, an extremely hard abrader. A weight loss of 0.005 g. was measured after 1000 cycles of abrasion.

EXAMPLE 10

This example describes the preparation of an elastomeric foam via the epoxy curing of a polyether diprimary diamine.

The polyether diprimary diamine of Example 4 was used in this experiment. 20 g. of it plus 6.6 g. of the diglycidyl ether of bisphenol A (oxirane equivalent weight=192), 0.33 g. of DMP-30 and 0.532 g. of oxybis(benzene sulfonyl hydrazide) were mixed in a shallow tray and placed in an oven at 145° C. The mix represents an oxirane/amine equivalence ratio of 4 to 1. This material was removed from the oven after 15 minutes. The product was a very elastic, relatively uniform foam with a density of 15 pounds per cubic foot, a tensile strength of 197 p.s.i. and an elongation of 290%.

EXAMPLE 11

This example describes the preparation of a flexible, adherent, durable, unpigmented epoxy coating from a polyether diamine.

A hard, flexible epoxy composition was painted on a concrete floor in an area of considerable traffic. This composition consisted of:

| | G. |
|---|---|
| 3600 molecular weight poly(tetramethylene oxide) diprimary diamine (product described in Example 2) | 18 |
| A bisphenol A diglycidyl ether (eq. wt.=192) | 38 |
| DMP-30 2,4,6-tris(dimethylaminomethyl)phenol] | 1.9 |

The coating cured to a tack-free state at room temperature over a 96-hour period. After 7 months of wear the coating had not been materially affected. No stripping of the coating had taken place, demonstrating the excellent adhesion of the composition.

A softer, more elastic coating was made and used to paint a portion of the floor next to the above coating. This composition consisted of:

| | G. |
|---|---|
| Poly(tetramethylene oxide) diprimary diamine (sample described in Example 4) | 43 |
| A bisphenol A diglycidyl ether (equivalent wt.=192) | 30 |
| DMP-30 | 1.5 |
| 1,1,1-trichloroethane | about 80 |

This coating also cured to a tack-free state at room temperature over a 96-hour period. After 7 months of wear some of the coating had been removed by abrasion and/or stripping, but by far the major portion of the coating was intact. Thus even this softer composition demonstrated excellent adhesion and abrasion resistance. Moreover, coatings applied on various substrates, including poly(chlorotrifluoroethylene) plastic, an elastomeric copolymer of chlorotrifluoroethylene and vinylidene fluoride and an elastomeric copolymer of vinylidene fluoride and hexafluoropropane, adhered tenaciously, especially after curing at 121° C. The films on the three above substrates could not be removed without damaging the substrates.

EXAMPLE 12

These examples illustrate the curing of polyether polyamines with formaldehyde to produce rubbery vulcanizates.

(A) 25 g. of 14,000 molecular weight poly(tetramethylene oxide) diprimary diamine was dissolved in 175 ml. of isobutanol and then the solution was added to 60 g. of a stirred 40% formaldehyde solution in n-butanol. A film was cast at 60° C. A transparent, snappy rubber was obtained.

(B) To 40 g. of the polyether diamine:formaldehyde adduct solution in (A) was added .1 g. of methylene dianiline in a 5 ml. of isobutanol. A film was cast at 60° C. from the resulting solution. The nontacky rubbery film obtained thereby was stronger and had higher modulus than the product in (A).

EXAMPLE 13

This example illustrates the chain extension of a poly(tetramethylene oxide) diprimary diamine to form an elastomeric polyether-urea.

35 g. of the poly(tetramethylene oxide) diprimary diamine shown in Example 4 and 3.86 g. of trans-2,5-dimethylpiperazine were dissolved in 900 g. of dimethyl formamide. 9.2 g. of methylene-bis(4-phenylisocyanate) dissolved in 20 ml. of tetrahydrofuran was added dropwise to the vigorously stirred amine solution at room temperature. A viscous product was obtained. A uniform film was cast centrifugally from this product and subjected to tensile testing. The following results were obtained:

| | |
|---|---|
| Stress at 100% elongation, p.s.i. | 1355 |
| Stress at 300% elongation, p.s.i. | 4170 |
| Ultimate tensile strength, p.s.i. | 8240 |

Elongation at break, percent _____ 470
Permanent set after elongation to break, percent __ 90.7
Tear strength, Graves, Die C, lbs./in. _____ 730

EXAMPLE 14

A mix was made of 86 g. of the polyether polyprimary polyamine of Example 3, 30 g. of the diglycidyl ether of bisphenol A (oxirane equivalent weight=192 and oxirane/amine equivalence ratio=4.7/1) and 1.5 g. of DMP-30 by stirring the ingredients together at 65° C. to produce a homogeneous mixture. This formulation was placed in a spherical mold having a diameter of 1.5 inches and heated for 17 hours at 105° C. The resulting ball had excellent cut resistance and was resilient, as illustrated by a drop rebound from a concrete floor of 70% at room temperature. A second ball was made under identical conditions from a resin mix in which the epoxy resin concentration was decreased to give a 2/1 ratio of oxirane/amine equivalence. This ball was softer, very cut resistant and showed a drop rebound from concrete of 84%.

EXAMPLE 15

This example describes the coupling of a polyether polyprimary polyamine of this invention with a diisocyanate and the subsequent curing of the resulting resin by reaction with an epoxy resin.

A solution of 0.435 g. of toluene diisocyanate (0.0025 mol of an 80/20 mixture of the 2,4- and 2,6-isomers) in 100 g. of toluene was slowly added to a rapidly stirred solution of 50 g. (0.005 mol) of the polyether polyprimary polyamine of Example 4 in 85 g. of toluene. 3.75 g. of the diglycidyl ether of bisphenol A (oxirane equivalent weight of 192) and 0.38 g. of DMP-30 were added to 142 g. of the above solution containing a polyether-urea-polyether polyprimary polyamine coupled product of approximately 20,000 number average molecular weight. A film was centrifugally cast from this solution and cured for 1 hour at 90° C. It had a tensile strength of 2700 p.s.i., an ultimate elongation of 400% and a permanent set at break of 0.5%.

EXAMPLE 16

This example sets forth the standard test procedures for characterizing the polyether polyprimary polyamines of this invention, using a controlled reaction with a standard epoxy resin formulation. These reaction products, as indicated earlier, have an ultimate tensile strength of at least 500 p.s.i. and an ultimate elongation of at least 400% at 23° C.

Seven polyoxytetramethylene polyprimary polyamines of varying amine equivalent weights were prepared by the procedures described earlier. Separate mixtures of stoichiometric concentrations (i.e., oxirane/amine equivalence ratio is 1:1, calculated as indicated earlier) of the polyether polyprimary polyamine and the diglycidyl ether of bisphenol A (oxirane equivalent weight of 190–200) plus two parts, per hundred parts by weight of total reactants, of 4,4'-thiobis(disecondary amyl phenol) were prepared by stirring at 90° C. until homogeneous. Each of the hot mixtures was poured into a centrifugal spin casting apparatus, where sheets were formed. All sheets were cured at 120° C. for four hours. Uniform tensile testing specimens were stamped from the cured sheets using Die C, as set forth in ASTM procedure D412–62T. Tensile tests were run at 23° C. after the test specimens were conditioned at 23° C. and 50% relative humidity for 24 hours after curing. A constant extension rate of 10 inches per minute was employed. The grips used to hold the test specimens were of the general type described in ASTM D412–62T, i.e., they are designed to increase gripping force as tension is increased. The tensile and elongation data are given in Table II.

| Sample | Amine equiv. wt. of polyether diprimary diamine | Approximate molecular weight | Ultimate tensile strength (p.s.i.) | Percent elongation at break |
|---|---|---|---|---|
| A | 584 | 1,200 | 370 | 55 |
| B | 729 | 1,500 | 380 | 55 |
| C | 1,200 (from Ex. 1) | 2,700 | 260 | 145 |
| D | 1,680 (from Ex. 2) | 3,600 | 640 | 460 |
| E | 2,500 | 5,500 | 1,500 | 810 |
| F | 4,200 | 9,000 | [1]1,800 | [1]770 |
| G | 4,610 (from Ex. 4) | 10,000 | [1]2,000 | [1]625 |

[1] Samples did not break at point of maximum elongation on test apparatus.

Samples A–C, using polyether polyprimary polyamines with molecular weights below about 3500, had unacceptably low values of both ultimate tensile strength and ultimate elongation.

EXAMPLE 17

This example illustrates the deleterious effect of reduced terminal primary amino functionality of the polyether polyprimary polyamine on the properties of the epoxy cured elastomers, as determined by the use of the standard curing test given in Example 16. A poly(tetramethylene oxide) monoprimary monoamine was prepared, as described in part A of this example, and small amounts of this material were mixed with a polyether polyprimary polyamine of essentially the same molecular weight (sample E in Example 16) and cured with an epoxy resin under the standard conditions.

A. Preparation of poly(tetramethylene oxide) monoprimary monoamine. 1300 ml. of tetrahydrofuran was distilled from LiAlH$_4$ into a 2 liter flask and cooled to −30° C. 19.7 g. of methyl trifluoromethane sulfonate catalyst was added. The reactants were allowed to warm to 0° C. and held at that temperature for 110 minutes until a very viscous solution was produced. Polymerization was terminated by pouring the reactants into a stirred solution of 400 ml. of liquid ammonia and 1200 ml. of tetrahydrofuran. Catalyst residues were removed by treatment with a strongly basic ion exchange resin. The final product (520 g. yield) after removal of solvent and excess ammonia was ω-amino-ω'-methoxypoly(tetramethylene oxide). The amine equivalent weight of this material was 4900.

B. The poly(tetramethylene oxide) polyprimary polyamine employed as Sample E in Example 16 was mixed with 15 (Sample H) and 30 (Sample I) mol percent of the polyether monoprimary monoamine prepared in part A of this example, and the resulting mixture was cured with stoichiometric epoxy resin under the conditions of the standard curing test given in Example 16. The results were as follows:

TABLE III

| Sample | Approximate percent inert end groups | Ultimate tensile strength (p.s.i.) | Ultimate percent elongation |
|---|---|---|---|
| E (from Ex. 16) | 0 | 1,500 | 810 |
| H | 7.5 | [1]227 | [1]975 |
| I | 15 | 23 | 1,030 |

[1] Samples did not break at point of maximum elongation of test apparatus.

The embodiments of the invention in which an exclusive property or privilege is claimed are defined as follows:

1. A water insoluble polyether polyamine having a molecular weight of at least 3500 and having a primary amino terminal group attached directly to each end of a polyether moiety containing recurring groups of which at least a major portion consists of oxytetramethylene recurring units and at most a minor portion consists of another oxyalkylene or thioalkylene recurring units having from 2 to 6 straight chain carbon atoms, at least half of said primary amino terminal groups having the structure —OC$_4$H$_8$NH$_2$, said polyether moiety having less than about three percent by weight of secondary amino nitrogen atoms and less than about 0.3 percent by weight of tertiary amino nitrogen atoms in its essentially linear chain.

2. The water insoluble polyether polyamine of claim 1 in which said polyether polyamine is esentially free of terminal hydroxyl groups.

3. The water insoluble polyether polyamine of claim 1 in which said polyether polyamine has a sufficiently high degree of primary amino terminal functionality to provide an elastomeric product having a minimum ultimate elongation of 400% and a minimum ultimate tensile strength of 500 p.s.i. when reacted with a stoichiometric amount of the diglycidyl ether of 2,2 - bis(para-hydroxyphenyl)propane (oxirane equivalent weight of 190–200) in the presence of 2 weight percent (based on total solids) of thiobis(disecondary amyl phenol) and cured in a mold for 4 hours at 120° C.

4. The water insoluble polyether polyamine of claim 1 having a molecular weight of at least 4500.

5. A water insoluble polyether polyamine having a molecular weight of at least 3500 and having a primary amino terminal group attached directly to each end of a polyether moiety consisting of recurring oxytetramethylene groups, up to 3 percent by weight of secondary amino nitrogen atoms and up to 0.3 percent by weight of tertiary amino nitrogen atoms in the essentially linear polyether chain.

6. A reaction product of an epoxy resin having an oxirane equivalence greater than one and the water insoluble polyether polyamine of claim 1.

7. The reaction product of claim 6 in foamed form.

8. A B-stage resin comprising the reaction product of the water insoluble polyether polyamine of claim 1 and an excess of an epoxy resin having an oxirane equivalence greater than 1, the oxirane/amine equivalence ratio being at least 1.5 to 1.

9. An elastomeric reaction product of an epoxy resin having an oxirane equivalence from 1.5 to 4 and the water insoluble polyether polyamine of claim 1 in which the molecular weight is between 3500 and 30,000, the oxirane/amine equivalence ratio being between 1.0 and 12.

10. The elastomeric polyether-urea reaction product of an organic diisocyanate, the polyether polyamine of claim 1, and from 1 to 20 mols, per mol of said polyether polyamine, of a nonpolymeric organic diprimary or disecondary diamine.

11. The elastomeric polyether-amide reaction product of an organic dicarboxylic acid or organic diacyl halide, the polyether polyamine of claim 1, and from 1 to 20 mols, per mol of said polyether polyamine, of a nonpolymeric organic diprimary or disecondary diamine.

12. An isocyanate capped polyether reaction product of the polyether polyamine of claim 1 and an excess of an organic polyisocyanate.

References Cited

UNITED STATES PATENTS 3,380,881   4/1968   Williamson et al.

WILLIAM H. SHORT, *Primary Examiner.*

T. PERTILLA, *Assistant Examiner.*

U.S. Cl. X.R.

117—161; 260—47, 78.4, 2.5, 830, 77.5